United States Patent [19]
Gommel et al.

[11] Patent Number: 6,162,326
[45] Date of Patent: Dec. 19, 2000

[54] PROCESS FOR DRAINING A FIBROUS PULP SUSPENSION

[75] Inventors: Axel Gommel, Ravensburg; Paul-Wilhelm Sepke, Ravensburg-Weissenau, both of Germany

[73] Assignee: Voith Sulzer Papiertechnik Patent GmbH, Ravensburg, Germany

[21] Appl. No.: 09/035,336

[22] Filed: Mar. 5, 1998

[30] Foreign Application Priority Data

Mar. 6, 1997 [DE] Germany ............... 297 04 062 U

[51] Int. Cl.$^7$ .................. D21C 9/00; D21H 23/00
[52] U.S. Cl. ............................. 162/100; 162/56
[58] Field of Search .................. 162/199, 56, 100, 162/201

[56] References Cited

U.S. PATENT DOCUMENTS

| | | |
|---|---|---|
| 1,421,364 | 7/1922 | Allen . |
| 2,278,525 | 4/1942 | Rich et al. . |
| 4,750,340 | 6/1988 | Anderson . |
| 5,269,945 | 12/1993 | Holmberg . |

FOREIGN PATENT DOCUMENTS

| | | |
|---|---|---|
| 61659 | 2/1891 | Germany . |
| 603025 | 9/1934 | Germany . |
| 613347 | 5/1935 | Germany . |
| 646992 | 6/1937 | Germany . |
| 879539 | 7/1953 | Germany . |
| 1057071 | 5/1959 | Germany . |
| 2212206 | 11/1972 | Germany . |
| 2322155 | 1/1974 | Germany . |
| 2811820 | 9/1978 | Germany . |
| 4340691 | 1/1995 | Germany . |
| 94/08088 | 4/1994 | WIPO . |
| 96/08600 | 3/1996 | WIPO . |
| 96/08660 | 3/1996 | WIPO . |

OTHER PUBLICATIONS

Copy of a German Search Report dated Aug. 26, 1997 prepared in connection with German Patent Application No. 197 09 084.2.

Copy of a European Search Report dated Nov. 4, 1997 prepared in connection with European Patent Application RS 98509 DE.

Primary Examiner—Christopher A. Fiorilla
Attorney, Agent, or Firm—Greenblum & Bernstein, P.L.C.

[57] ABSTRACT

A process for draining a fibrous pulp web is preferably carried out on drum thickeners or disk filters. A suspension to be drained rests against a perforated first face, which is a part of the rotor of the drum thickener or disk filter, is transported from the suspension vat, and then arrives in a thickening region. The thickening region contains a second face, wherein the first and second face have a relative speed in relation to each other. The effectiveness of the thickening can be significantly increased by vacuum zones provided on the drum thickener or disk filter.

17 Claims, 2 Drawing Sheets

PROCESS FOR DRAINING A FIBROUS PULP SUSPENSION

CROSS-REFERENCE OF RELATED APPLICATION

The present invention claims the priority under 35 U.S.C. §119 of German Patent Application No. 297 04 062.6 filed on Mar. 6, 1997, the disclosure of which is expressly incorporated by reference herein in its entirety.

BACKGROUND OF THE INVENTION

1. Field of the Invention

The invention relates to a process for draining a fibrous pulp suspension that includes pre-draining the fibrous pulp suspension in an open top container, disposing the fibrous pulp suspension against a moving, perforated first face, which, due to different pressures acting on opposite sides of the first face is thus drained, and transporting the pre-drained suspension upwardly out of the fibrous pulp suspension for further draining. The invention also relates to a drum thickener for the multi-stage draining of a fibrous pulp suspension.

2. Discussion of Background Information

Processes of this kind are used in order to either increase the pulp density of the fibrous pulp suspension or to remove undesirable components from the fibrous pulp suspension by washing. Both processes are more or less strongly connected with each other because draining is naturally necessary for the washing of a fibrous pulp suspension. On the other hand, though, the extent of the washing effect is a function of other parameters, i.e. not only the increase of the pulp density. Processes of the type mentioned above can be carried out, for example, with known devices for draining a fibrous pulp suspension, the so-called drum thickeners. These form a fibrous web on the outside of a drum that dips into the suspension and this fibrous web is drained into the interior of the drum. Due to the circumferential movement of a drum of this kind, the fibrous pulp web is transported out of the suspension container and can be removed as a thickened pulp. It is then often characterized as accepted stock. Steps have also already been carried out for further increasing the pulp density of the pulp that has already come out of the suspension and is still adhering to the drum. To this end, in particular, so called couch rolls are used, which produce an additional pressure on the fibrous pulp web. Or one presses, a revolving belt against the web, e.g. according to U.S. Pat. No. 2,278,525 or WO 94/08088. As a rule, measures of this kind do achieve a further increase of the pulp density, but this is often still too slight and is also partially reduced again, e.g. by remoistening upon emerging from the nip.

In a drum thickener according to U.S. Pat. No. 1,421,364, the vat is completely filled with suspension during operation. The polygonal outer surface of the drum conveys the thickened pulp out along arched sealing faces.

WO 96/08600 describes another draining device. This likewise contains a rotating drum with a permeable surface. On a part of the circumference, the drum is encompassed by an impermeable plastic belt. The suspension is sprayed into the gap formed between the drum and plastic belt with the aid of a headbox. A vacuum is applied from the inside in this region, in which the pulp jet reaches the drum wall. This machine is very expensive to produce and operate.

U.S. Pat. No. 4,750,340 discloses a device suitable for thickening, with a rotary driven, perforated drum which is surrounded by an arched plate fixed to the drum in a slightly eccentric manner. As a result, a nip is formed between the drum and the wall, into which already pre-thickened pulp is introduced by way of a feed worm. The device is very costly and is particularly suited for higher initial pulp densities.

SUMMARY OF THE INVENTION

The present invention utilizes a process of the kind mentioned in the background and to arrange it in such a way that an improved draining capacity is achieved along with a high degree of operational safety.

The present invention provides a perforated first face on a rotatable drum or disk and a second face fixed relative thereto, wherein the first and second faces are moved relative to one another and pressed toward each other with force.

The process of the present invention also permits, for example, the further improvement of the intrinsically known, effective, and reliable process of drum thickening. Draining can be easily carried out by dipping a perforated drum into a suspension, wherein the fibrous pulp comes to rest to a greater or lesser extent on the perforated outside of a drum of this kind. The forces that arise are sufficient to transport the thickened fibrous pulp out of the suspension with the aid of the drum motion. In an adjoining region in which a sieve, belt, or press shoe is fixed in such a way that a relative speed is produced between the drum wall and the sieve, the layer of fibrous pulp disposed therebetween can be loosened and torn by shearing forces.

What has been explained above in conjunction with a drum thickener can easily be transferred to other machines in which a container filled with suspension is drained through a moving, perforated face. This also applies to disk filters. Machines of this type contain perforated hollow disks with a horizontal axis, and the filtrate collects within the disks and is removed therefrom. Through the motion disks of this type, the pre-thickened fibrous pulp adheres to the outside, is transported out of the suspension vat, and then arrives in the thickening region. In the thickening region of a machine of this type, a stationary, flexible belt or a press shoe can be pressed against the perforated disk. In this embodiment of the process, the design of the required devices is relatively more complicated compared to a drum, in particular in relation to the embodiment of the thickening region and the removal of the completely thickened fibrous pulp; on the other hand, though, apparatuses with a high throughput can be accommodated in a relatively small space. As is known, there are not only disk filters with one disk, but also—and this is the rule—there are those with a number of disks disposed axially next to one another.

A considerable advantage of the new process lies in the upward movement of the thus thickened fibrous pulp before entry into the thickening region. Namely, the portions of lower pulp density which are found on the side of the fibrous pulp layer turned away from the face, drain away by themselves and do not reach the thickening region. Consequently, the fibrous pulp in this region is pre-drained in a relatively homogeneous manner. Among other things, this is a favorable requirement for the formation of small rolls described below.

Depending on the conditions set, it is possible that the fibrous pulp layer tears in the thickening region and forms agglomerates which then execute a rolling motion. This rolling motion leads to a particularly effective compacting of the fibrous pulp. It has also proven to be the case that in many instances, the diameter of the small rolls thus formed is greater than the thickness of the thickened fibrous layer surrounding them. As a result, the press action concentrates particularly on the small rolls and contributes to increased draining of the small rolls. If the second face is also chosen to be water permeable, then the water that has passed through them can flow away into the region that is disposed later, viewed in terms of the run direction (of the first face), and can flow back again through the second face. Since the fibrous pulp layer is torn here, the water finds space for penetrating through the first face. The water removal from the second face is therefore quite simple. The thickening region or the perforated part of the second face can advantageously begin close to the highest point so that the water flows away unhindered in the direction of travel (of the first face). The small rolls that are forcefully compressed by the external pressing forces do not absorb any water and the remoistening therefore remains low.

With the present invention, it is also possible to bring about a formation of small rolls without additional vacuum applied in the thickening region.

At the outset, the suspension to be thickened can easily have a very low solids content, e.g. below 1%. With correspondingly favorable guidance of the process, a thickened fibrous pulp with a solids content of between 20 and 30% can nevertheless be produced, which means a quantitatively significant removal of water. For these reasons, the process is suitable to wash undesirable components out with good results during the draining of the suspension.

BRIEF DESCRIPTION OF THE DRAWINGS

The present invention is further described in the detailed description which follows, by reference to the noted plurality of drawings by of non-limiting examples or preferred embodiments of the present invention, in which like reference numerals represent similar parts throughout the several views of the drawings, and wherein.

DETAILED DESCRIPTION OF THE INVENTION

The particulars shown herein are by way of example and for purposes of illustrative discussion of the present invention only and are presented in the cause of providing what is believed to be the most useful and readily understood description of the principles and conceptual aspects of the invention. In this regard, no attempt is made to show structural details of the invention in more detail than is necessary for the fundamental understanding of the invention, the description taken with the drawings making apparent to those skilled in the art how the several forms of the invention may be embodied in practice.

Figure 1:
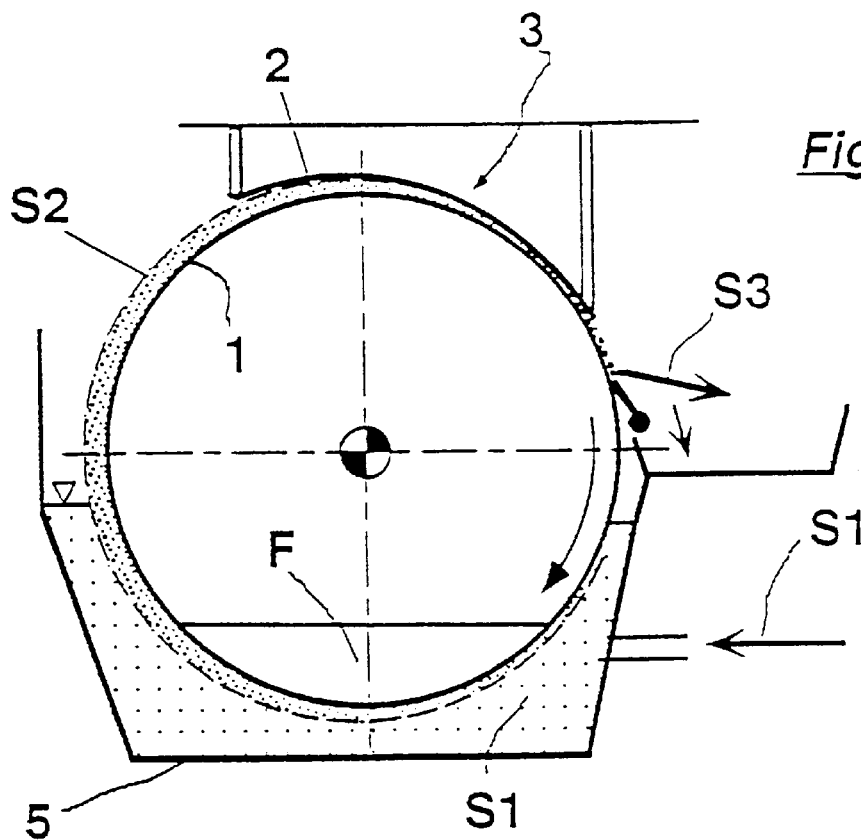
FIG. 1 shows a drum thickener suited for carrying out the process according to a first embodiment of the present invention.

In the thickening device shown in FIG. 1, the first face 1 is depicted in the form of a cylindrical, perforated sieve body, wherein only a few of the very numerous openings are shown. The openings advantageously are part of a sieve cloth stretched on a rotor foundation. The sieve body dips into a suspension vat 5, which during the execution of the process is filled to a particular degree with the suspension to be thickened S1. Due to the hydrostatic pressure of the suspension S1, this is drained against the immersed part of the first face 1, i.e. filtrate F flows into the inside and can be removed, e.g. axially. As a result of the rotational movement of the first face 1, the pre-thickened suspension S2 adhering to it emerges from the vat and then travels into the thickening region 3, which contains the second face 2. Since the second face is stationary, the rotational movement of the first face 1 produces a relative motion, which remarkably improves the draining action. It is particularly favorable to embody the second face 2 as a flexible, stretched belt 4 (FIG. 2), particularly since this allows continuous pressure ratios to be adjusted in the thickening region 3. With a fibrous pulp layer that has different thicknesses, a belt of this kind can move out of the way and the pressure can be easily adjusted. Fundamentally speaking, though, one or a number of rigid faces are conceivable, provided that they have a suitable shape and surface. After passing through the thickening region 3, a thickened fibrous pulp S3 leaves the face 1, e.g. at a doctor. If the second face 2 is likewise water permeable and is used for a water removal from this face, the final dry matter content can be increased further. Depending on the choice of parameters, higher pulp densities—approx. 30%—or also lower pulp densities—approx. 15 to 20%—can be achieved for the thickened fibrous pulp.

Although the device depicted here is a machine that is embodied quite simply, when the process according to the invention is used, quite large quantities of water can be removed from the pulp.

If a higher output capacity or higher dry matter content is desired, the process can be improved by virtue of the fact that the pre-draining occurs not only due to the hydrostatic level, but can also be increased with additionally applied vacuum. The same is true for the thickening region. To that end, a suction box can be provided on the inside of the drum face and this suction box aspirates away the filtrate at stationary points. This is known to a sufficient degree and therefore is not depicted.

In other instances, it is advantageous to divide up the drum or also the filter disk into sectors and to apply vacuum to these sectors by way of a central master filter valve. The finer the sectioning of the drum is chosen to be, the more precisely and effectively is the vacuum applied. This technique is known from the production of disk filters.

Figure 2:
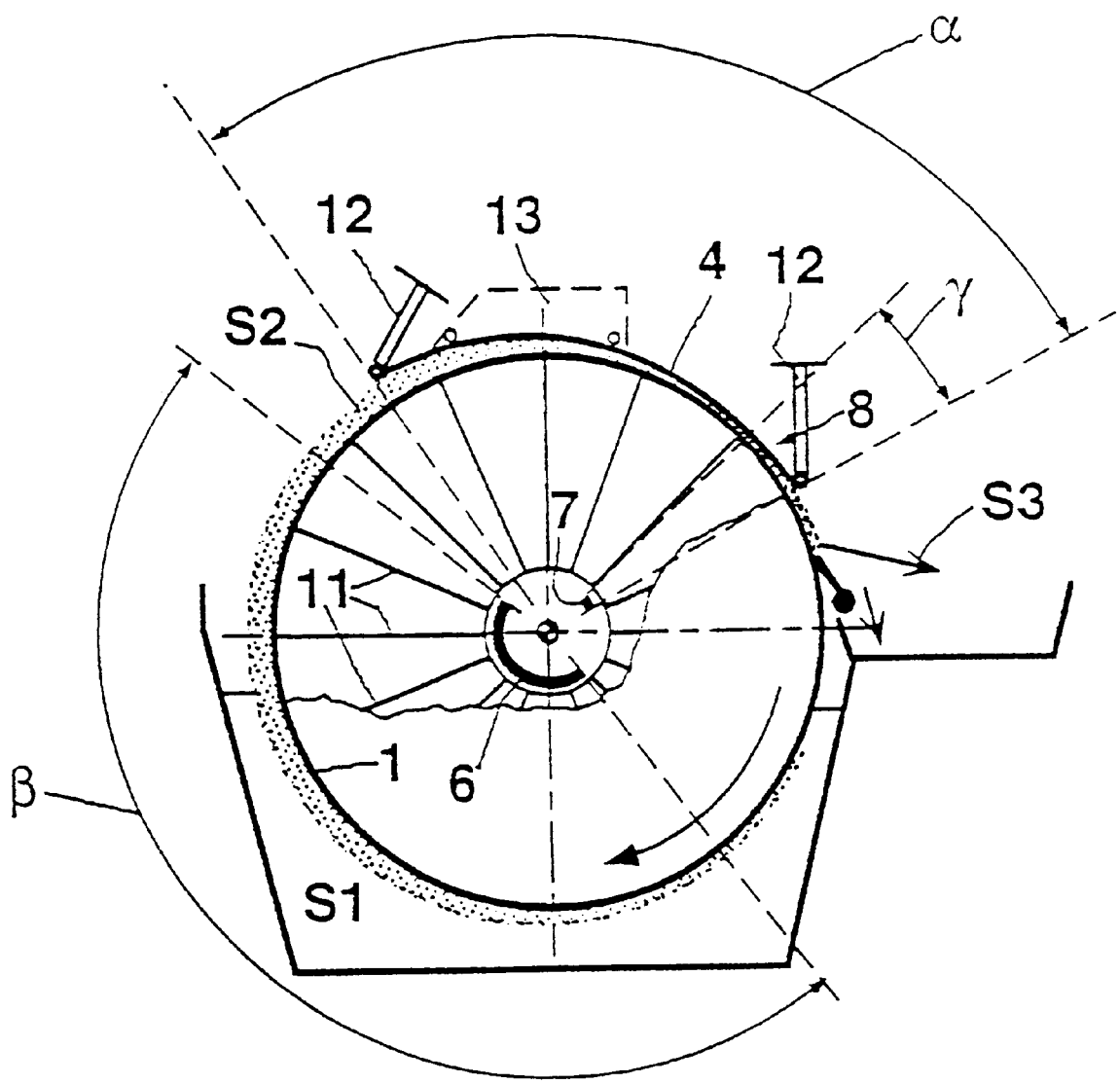
FIG. 2 shows another drum thickener according to a second embodiment of the present invention.

FIG. 2 shows a sectioned drum thickener in which the drum is divided into chambers by radial dividing walls 11. The second face is embodied here as a flexible belt 4, which is stretched by tension devices 12 and pressed against the drum that constitutes the first face 1. It spans the first face 1 over a circumference angle α of approximately 95°. It can be water permeable over its entire length or over part of its length. As already mentioned, the vacuum applied can be controlled as a function of circumference angle by sectioning the drum. This possibility is indicated by annular grooves 6 and 7, respectively, in the vicinity of the rotational axis. By measures like this, it is possible to influence the draining, e.g. at a first circumference angle β, and to influence the effect in the thickening region in the course of the second circumference angle γ. While the increased vacuum in the pre-draining zone is predominantly used to carry along a large quantity of pre-drained suspension S2, the aspiration at the end of the subsequent draining zone achieves a reduction in remoistening. The length of the latter aspiration zone can be relatively short since this concerns free water. A length of about 10 to about 100 mm is preferred in this regard. Naturally, vacuum can also be applied through the flexible belt 4 if it is water permeable. A water catch basin 13 with axial outflows is indicated as an alternative to water removal at the water permeable flexible belt 4.

As has already been mentioned, an intrinsically known disk filter can also be used to carry out the process, if it is correspondingly modified.

Figures 3A, 3B:
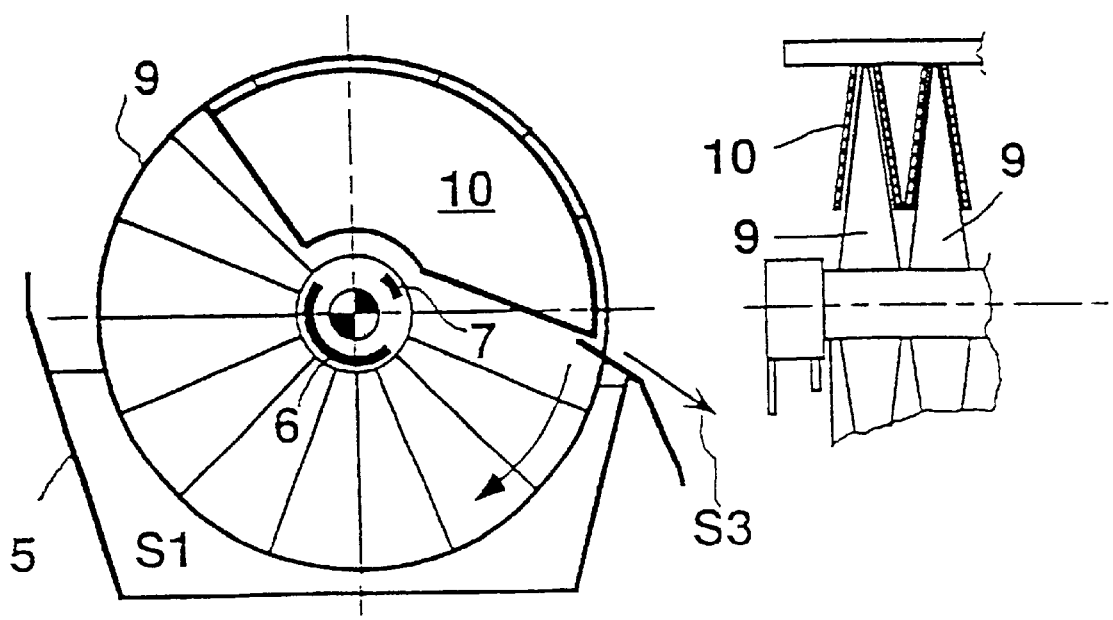
FIGS. 3a and 3b show a disk filter according to a third embodiment of the invention.

Modifications of this kind are represented by way of example in FIGS. 3a and 3b. FIG. 3a shows a side view and FIG. 3b shows a section of the filter disks 9. On their sides, these carry the first face 1 mentioned in the definition of the process, which face is thus comprised of a large number of perforated side faces. By rotating the filter disk, the pre-thickened suspension S2 (not shown here) is transported out of the suspension and then between the pressure plates 10. The apparatus-related details, e.g. the exertion of axial compressive forces on the disks 9 and the transporting of the thickened fibrous pulp out from the region between the disks, are not shown here.

It is noted that the foregoing examples have been provided merely for the purpose of explanation and are in no way to be construed as limiting of the present invention. While the invention has been described with reference to a preferred embodiment, it is understood that the words which have been used herein are words of description and illustration, rather than words of limitation. Changes may be made, within the purview of the appended claims, as presently stated and as amended, without departing from the scope and spirit of the invention in its aspects. Although the invention has been described herein with reference to particular means, materials and embodiments, the invention is not intended to be limited to the particulars disclosed herein; rather, the invention extends to all functionally equivalent structures, methods and uses, such as are within the scope of the appended claims.

What is claimed:

1. A process for multi-stage draining of a fibrous pulp suspension in an apparatus which includes an open container containing the fibrous pulp suspension, the apparatus further including a thickening region which is formed between a perforated first face, which is rotatable in a first direction, and at least one second face which is stationary in the first direction, the at least one second face being arranged to converge toward the first face, the process comprising:

rotating the perforated first face in the container in the first direction so as to form a layer of fibrous pulp suspension on the rotating perforated first face;

transporting the formed layer on the perforated first face upwardly out of the container;

guiding the formed layer into the thickening region formed between the perforated first face rotating in the first direction and the second face which is stationary in the first direction, whereby a thickened fibrous pulp is formed from the layer; and removing the thickened fibrous pulp from the perforated first face.

2. The process according to claim 1, wherein the at least one second face is perforated.

3. The process according to claim 1, wherein the at least one second face is impermeable.

4. The process according to claim 1, wherein the at least one second face comprises a surface which applies greater frictional forces to the layer than the perforated first face.

5. The process according to claim 1, wherein the at least one second face comprises a flexible belt which is stretched between at least two locations.

6. The process according to claim 5, wherein the flexible belt comprises a sieve cloth.

7. The process according to claim 1, wherein the perforated first face comprises a horizontally disposed cylindrical sieve drum with an interior penetrated by a filtrate.

8. The process according to claim 1, wherein the thickened fibrous pulp is formed without vacuum being applied to the perforated first face.

9. The process according to claim 1, wherein the perforated first face comprises at least one side face of at least one hollow disk, an interior of which is penetrated by a filtrate.

10. The process according to claim 9, wherein the perforated first face comprises a rotor which presses against the at least one second face with an essentially axial force.

11. The process according to claim 1, wherein a pressure difference on opposite sides of the perforated first face results from different fill levels of the fibrous pulp suspension and filtrate.

12. The process according to claim 1, further comprising applying a vacuum to the perforated first surface.

13. The process according to claim 12, wherein said vacuum is between 0.1 and 0.3 bar.

14. The process according to claim 1, further comprising forming a suction zone subsequent to the end of the thickening region in which a vacuum is applied.

15. The process according to claim 14, further comprising applying the vacuum through the side of the perforated first face not covered with the layer over a circumference length of 100 mm maximally.

16. The process according to claim 1, further comprising subjecting the layer to tearing in the thickening region as a result of adhesion and friction forces between the layer and the perforated first and the at least one second faces, and thereby forming agglomerates in the shape of small rolls.

17. A process for multi-stage draining of a fibrous pulp suspension in an apparatus which includes an open container containing the fibrous pulp suspension, the apparatus further including a thickening region which is formed between a perforated first face, which is rotatable in a first direction, and at least one second face which is stationary in the first direction, the at least one second face being arranged to converge toward the first face, the process comprising:

rotating the perforated first face in the container in the first direction so as to form a layer of fibrous pulp suspension on the rotating perforated first face;

transporting the formed layer on the perforated first face upwardly out of the container;

shearing portions of the formed layer in the thickening region so as to move in a direction from the perforated first face rotating in the first direction to the second face which is stationary in the first direction, whereby a thickened fibrous pulp is formed from the layer; and removing the thickened fibrous pulp from the perforated first face.

* * * * *